(12) United States Patent
Oh et al.

(10) Patent No.: US 11,420,562 B2
(45) Date of Patent: Aug. 23, 2022

(54) BACKLIGHT UNIT

(71) Applicant: MEEKYUNGTEC CO., LTD, Gyeonggi-do (KR)

(72) Inventors: Se-Been Oh, Gyeonggi-do (KR); Seung-Zu Young, Gyeonggi-do (KR); Jung Seok Yoon, Gyeonggi-do (KR)

(73) Assignee: MEEKYUNGTEC CO., LTD, Gyeonggi-do (KR)

( * ) Notice: Subject to any disclaimer, the term of this patent is extended or adjusted under 35 U.S.C. 154(b) by 240 days.

(21) Appl. No.: 16/633,443

(22) PCT Filed: Sep. 6, 2017

(86) PCT No.: PCT/KR2017/009741
§ 371 (c)(1),
(2) Date: Jan. 23, 2020

(87) PCT Pub. No.: WO2019/027088
PCT Pub. Date: Feb. 7, 2019

(65) Prior Publication Data
US 2020/0223365 A1 Jul. 16, 2020

(30) Foreign Application Priority Data

Aug. 3, 2017 (KR) .................. 10-2017-0098585

(51) Int. Cl.
*B60Q 1/00* (2006.01)
*B60R 1/12* (2006.01)
(Continued)

(52) U.S. Cl.
CPC .............. *B60R 1/12* (2013.01); *B60Q 1/0029* (2013.01); *B60Q 1/24* (2013.01); *B60Q 1/2665* (2013.01);
(Continued)

(58) Field of Classification Search
CPC .... B60R 1/12; B60R 1/06; F21S 43/40; F21S 43/14; F21S 43/31; F21S 43/26;
(Continued)

(56) References Cited

U.S. PATENT DOCUMENTS 5,528,720 A    6/1996   Winston et al.
8,058,977 B2   11/2011   Lynam
(Continued)

FOREIGN PATENT DOCUMENTS

CN    104896395 A    9/2015
CN    105805698 A    7/2016
(Continued)

OTHER PUBLICATIONS

Extended European Search Report issued by the European Patent Office dated Dec. 9, 2020.
(Continued)

*Primary Examiner* — Y M. Quach Lee
(74) *Attorney, Agent, or Firm* — IP & T Group LLP

(57) ABSTRACT

A backlight unit 10 for an outside mirror of a vehicle may comprise: a light source unit 30 including at least one light source 31 disposed therein; a light processing unit 40 having at least one light passage 41 through which light emitted from the light source 31 passes while being diffused, and a reflective surface 42 for reflecting the light having passed through the light passage 41; and a photorefractive means 60 which is disposed at a light exit of the light processing unit and refracts light emitted from the light exit of the light processing unit to be oriented toward a driver's seat.

13 Claims, 8 Drawing Sheets

(51) Int. Cl.
*F21V 7/28* (2018.01)
*B60Q 1/24* (2006.01)
*F21V 3/02* (2006.01)
*F21V 5/00* (2018.01)
*F21V 7/00* (2006.01)
*F21V 8/00* (2006.01)
*F21S 43/14* (2018.01)
*F21S 43/15* (2018.01)
*F21S 43/31* (2018.01)
*F21S 43/20* (2018.01)
*F21S 43/40* (2018.01)
*B60Q 1/26* (2006.01)
*B60R 1/06* (2006.01)
*F21Y 103/10* (2016.01)
*F21Y 115/10* (2016.01)

(52) U.S. Cl.
CPC .............. *B60R 1/06* (2013.01); *B60R 1/1207* (2013.01); *F21S 43/14* (2018.01); *F21S 43/15* (2018.01); *F21S 43/26* (2018.01); *F21S 43/31* (2018.01); *F21S 43/40* (2018.01); *F21V 3/02* (2013.01); *F21V 5/00* (2013.01); *F21V 7/0008* (2013.01); *F21V 7/28* (2018.02); *G02B 6/005* (2013.01); *G02B 6/0013* (2013.01); *G02B 6/0031* (2013.01); *G02B 6/0051* (2013.01); *G02B 6/0053* (2013.01); *G02B 6/0055* (2013.01); *G02B 6/0068* (2013.01); *G02B 6/0091* (2013.01); *F21Y 2103/10* (2016.08); *F21Y 2115/10* (2016.08)

(58) Field of Classification Search
CPC ...... F21V 7/28; F21V 3/02; F21V 5/00; F21V 7/0008; B60Q 1/0029; B60Q 1/24; G02B 6/0031; G02B 6/005; G02B 6/0051
See application file for complete search history.

(56) References Cited

U.S. PATENT DOCUMENTS

| | | |
|---|---|---|
| 2003/0081402 A1 | 5/2003 | Jeon et al. |
| 2004/0109105 A1 | 6/2004 | Nagakubo et al. |
| 2008/0225417 A1* | 9/2008 | Kuhn ................. B60R 1/12 359/839 |
| 2013/0188377 A1 | 7/2013 | Konishi |
| 2016/0209000 A1 | 7/2016 | Kurschner et al. |

FOREIGN PATENT DOCUMENTS

| | | |
|---|---|---|
| JP | 2014-0017060 | 1/2014 |
| JP | 2014-135120 A | 7/2014 |
| JP | 2015-170597 A | 9/2015 |
| KR | 20-2014-0001114 | 2/2014 |
| KR | 10-1519763 | 5/2015 |
| KR | 10-1526792 | 6/2015 |
| KR | 10-2016-0049727 | 5/2016 |
| KR | 10-1637331 | 7/2016 |
| KR | 10-2017-0007922 | 1/2017 |
| KR | 10-2017-0139932 | 12/2017 |
| KR | 10-1804311 | 12/2017 |

OTHER PUBLICATIONS

Office Action issued by the Japanese Patent Office dated Aug. 17, 2021.

Office Action issued by the Chinese Patent Office dated Sep. 28, 2021.

* cited by examiner

BACKLIGHT UNIT

This application is a national stage application of PCT/KR2017/009741 filed on Sep. 6, 2017, which claims priority of Korean patent application number 10-2017-0098585 filed on Aug. 3, 2017. The disclosure of each of the foregoing applications is incorporated herein by reference in its entirety.

TECHNICAL FIELD

The present disclosure relates to a backlight unit for an outside mirror of a vehicle, and more particularly, to a backlight unit for an outside mirror of a vehicle, which can refract light emitted therefrom toward a driver seat.

Background Art

In general, an outside mirror of a vehicle is a basic part used as a reflecting mirror through which a driver can see surroundings on the left or right rear side of the vehicle. As illustrated in FIG. 1, however, an outside mirror of a vehicle has blind spot in a predetermined angle range, due to the limitation in visual observation of a driver and the structural characteristics of the vehicle. The blind spot of the vehicle may be defined as an area in a range of about 13° to 45° based on a side surface of the vehicle body. During driving, an assist device such as an assist side mirror is, used to enable the driver to more easily check that a vehicle in an adjacent lane is located in the blind spot on the left or right rear side of the vehicle, which is difficult to check through the outside mirror. However, the assist device cannot completely show that the vehicle in the adjacent lane is located in the blind spot.

Therefore, in order to accurately sense whether another vehicle is located in a blind spot of an ego vehicle and provide the sensing information to a driver, a BSM system (Blind Spot Monitoring system) is applied as a warning system which senses whether another vehicle is located in a blind spot on the left or right rear of the ego vehicle through sensors such as a radar, an ultrasonic sensor and a camera, and provides the sensing information to the driver.

For example, as illustrated in FIG. 2, a structure in which an indicator icon is formed on an outside mirror through etching and a backlight unit is attached to the rear surface or glass is used in the BSM system. When such a BSM system senses another vehicle entering a blind spot and sends a signal, the backlight unit emits and light is transmitted to the indicator icon. Then, the indicator icon on the outside mirror surface is flickered to inform the driver of the entrance of another vehicle into the blind spot.

Korea Utility Model Application Publication No. 20-2014-0001114 (published on Feb. 20, 2014) discloses a conventional backlight unit for illuminating an indicator icon in a BSM system, which is a nonreflecting direct-type backlight unit for directly illuminating an indicator icon. Korean Patent No. 10-1637331 (published on Jul. 7, 2016) discloses a backside reflection-type backlight unit which illuminates a backside reflecting surface and an indicator icon is illuminated by the light reflected from the backside reflecting surface. However, the nonreflecting direct-type backlight unit or the backside reflection-type backlight unit has difficulties in implementing favorable uniformity of light due to light concentration.

In order to solve the problems of the nonreflecting direct-type backlight unit or the backside reflection-type backlight unit, surface emission-type backlight units which can use the entire light emission surface of a backlight have been disclosed in Korean Patent No. 10-1526792 (published on Jun. 5, 2015), Korean Patent Application No. 10-2016-0072565 (filed on Jun. 10, 2016), Korean Patent Application No. 10-2017-0036767 (filed on Mar. 23, 2017) and the like.

The indicator icon in the BSM system may be flickered to inform a driver of entrance of another vehicle into a blind spot, in order to improve the stability of vehicle operation. However, the flickering of the BSM indicator icon of the outside mirror may confuse a driver in a vehicle located on the left or right rear side, and make the driver mink like an assist turn signal mounted at the outer leading edge of the outside mirror is flickered. In this case, the flickering of the BSM indicator icon may disturb the driver in the vehicle on the left or right rear side. Due to such a problem, a BSM indicator limits the amount of light leaking to areas other than the inside of the vehicle, for example, the driver area of another vehicle.

As illustrated in FIG. 3, outside areas of sides $T_0$ and $T_1$ parallel to the side surfaces of the vehicle body based on both of the outside mirrors are referred to as 'light leakage areas', and the luminous intensity of the BSM indicator in the light leakage area is limited to 0.2 cd or less, for example. When the luminous intensity of the BSM indicator in the light leakage area is equal to or less than 0.2 cd, flickering of the BSM indicator may not be recognized as flickering of the assist turn signal by a driver another vehicle. In order to secure the visibility of the BSM indicator, the luminous intensity of the BSM indicator in the driver area is required to have a value of about 0.4 cd to 0.6 cd, for example.

That is, the BSM system needs to maintain the luminous intensity of the BSM indicator at a higher level in the driver area of the ego vehicle than in the light leakage areas corresponding to a driver area of another vehicle. Therefore, the light distribution direction the backlight unit for illuminating the BSM indicator icon needs to be controlled to face the driver.

For such a necessity, a unit 410 for changing the direction of light in a light path may be used in a nonreflecting direct-type backlight unit that directly illuminates an indicator con, as disclosed in U.S. Pat. No. 8,058,977 (registered on Nov. 15, 2011) (see FIG. 4). In this case, it is difficult to implement favorable uniformity of light due to light concentration.

The unit for changing the direction of light in a light path may also be used in the backside reflection-type backlight unit that illuminates a backside reflecting surface and an indicator icon is illuminated by the light reflected from the backside reflecting surface. In this case, however, the structure of the backlight unit becomes complex, and light concentration makes it difficult to implement favorable uniformity of light.

DISCLOSURE

Technical Problem

The present disclosure has been proposed solve the above problems and various embodiments are directed to backlight unit for an outside mirror of a vehicle, which can refract light emitted therefrom toward a driver seat, and thus lower the luminous intensity of a BSM indicator in a driver area of another vehicle to a lower value than in a driver area of an ego vehicle.

Technical Solution

In an embodiment, a backlight unit for an outside mirror of a vehicle may include: a light source unit having one or more light sources; a light processing unit having one or more light paths through which light emitted from the light source passes while dispersed and a reflecting surface which reflects the light having passed through the light path; and a light refraction unit disposed at a light exit of the light processing unit, and configured to refract light, illuminated from the light exit of the light processing unit, toward a driver seat.

The light refraction unit may have a plurality of protrusions arranged in a vertical direction on a rear surface thereof, which faces the light exit of the light processing unit and on which light is incident, and a front surface of the light refraction unit, from which the light incident on the light refraction unit is emitted, may be formed as a flat surface parallel to a horizontal axis of the light refraction unit, wherein each of the protrusions has a vertical surface and an inclined surface inclined in the opposite direction of the driver seat. On the other hand, a rear surface of the light refraction unit, on which light is incident, may be formed as a flat surface parallel to the horizontal axis of the light refraction unit, and the front surface of the light refraction unit, from which the light is emitted, may have protrusions (not illustrated) each having a vertical surface and an inclined surface.

The angle between the inclined surface of the light refraction unit and the surface perpendicular to the horizontal axis of the light refraction unit in a backlight unit installed on a rear surface of an outside mirror mounted on driver side of the vehicle may range from about 39° to 59°. More preferably, the angle may range from about 44° to 54°. The angle between the inclined surface of the light refraction unit and the surface perpendicular to the horizontal axis of the light refraction unit in a backlight unit 10 installed on a rear surface of an outside mirror mounted on a passenger side of the vehicle may range from about 47° to 67°. More preferably, the angle may range from about 52° to 62°.

The brightness of light in the driver area, emitted through the backlight unit, may range from about 0.4 to 0.6 cd, and the brightness of light in driver area of another vehicle may be about 0.2 cd or less.

In an embodiment, a backlight unit for an outside mirror of a vehicle may include: a case having an internal space and having an opening formed on a side surface thereof, a light source unit mounted in the internal space of the case and capable of emitting light when power is supplied; a light guide plate configured to diffuse light, emitted from the light source unit, across the entire area thereof; a reflecting plate stacked on a rear surface of the light guide plate and configured to reflect light illuminated from the rear surface of the light guide plate toward a front surface of the light plate; and a light refraction unit stacked on a front surface of the light guide plate and configured to refract light illuminated from the front surface of the light guide plate toward a driver seat.

In an embodiment, a backlight unit for an outside mirror of a vehicle may include: a lower casing; a light source unit mounted on an inner bottom surface of the lower casing and capable of emitting light when power is supplied; a light guide plate mounted at an inner top of the lower casing and configured to transfer light emitted from the light source unit; a reflecting plate stacked on a rear surface of the light guide plate and configured to reflect light illuminated from the rear surface of the light guide plate toward a front surface of the light plate; a light refraction unit stacked on the front surface of the light guide plate and configured to refract light, illuminated from the front surface of the light guide plate, toward a driver seat; and an upper casing having a central portion formed in an open frame shape, and coupled to the top of the lower casing.

Advantageous Effects

In accordance with the embodiments of the present disclosure, the backlight unit can refract light emitted therefrom toward the driver seat, and thus lower the luminous intensity of the BSM indicator in the driver area of another vehicle to a lower value than in the driver area of the ego vehicle.

DETAILED DESCRIPTION

Figure 1:
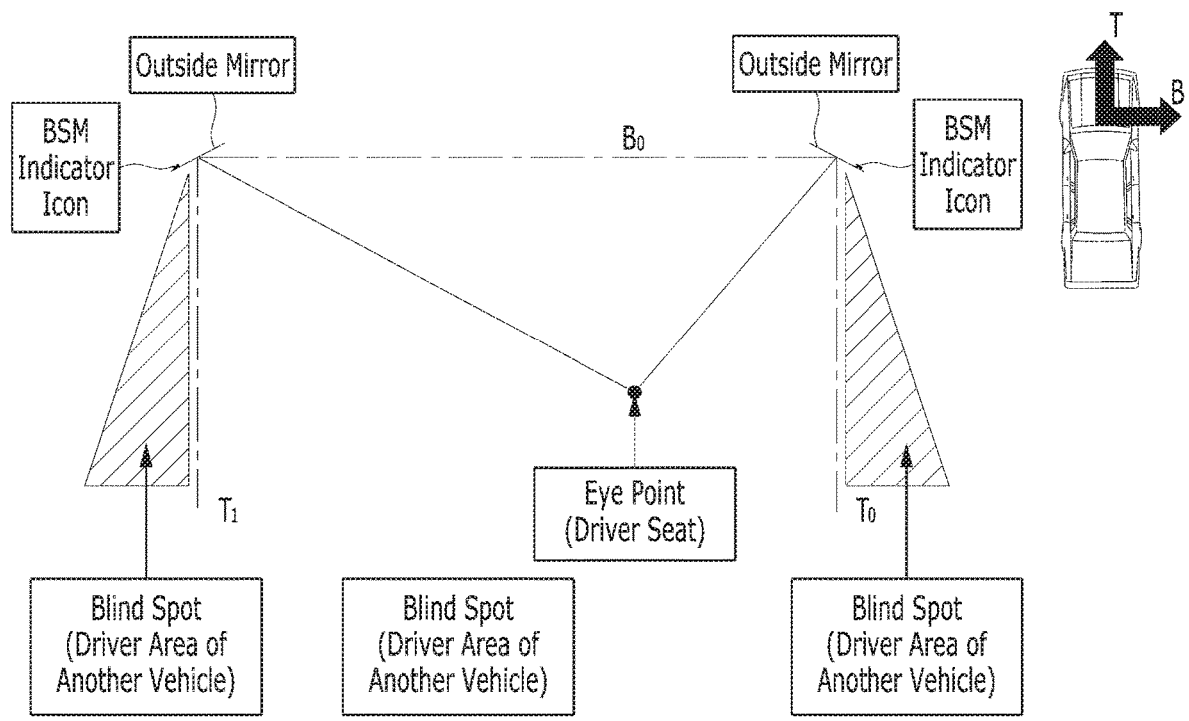
FIG. 1 is a diagram schematically illustrating blind spots on the left and right rear sides of a vehicle.
Figure 2:
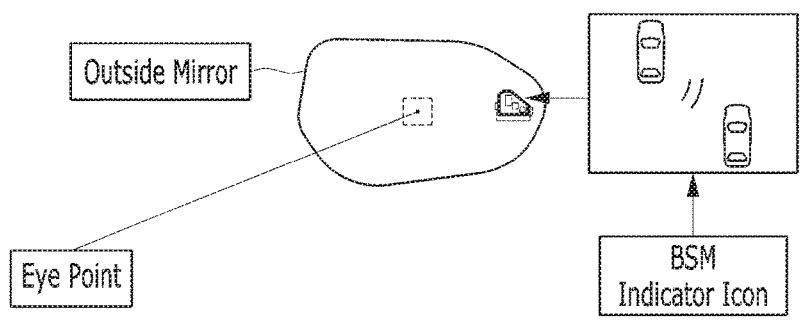
FIG. 2 is a diagram schematically illustrating an indicator icon of a BSM system mounted in an outside mirror of a vehicle.
Figure 3:
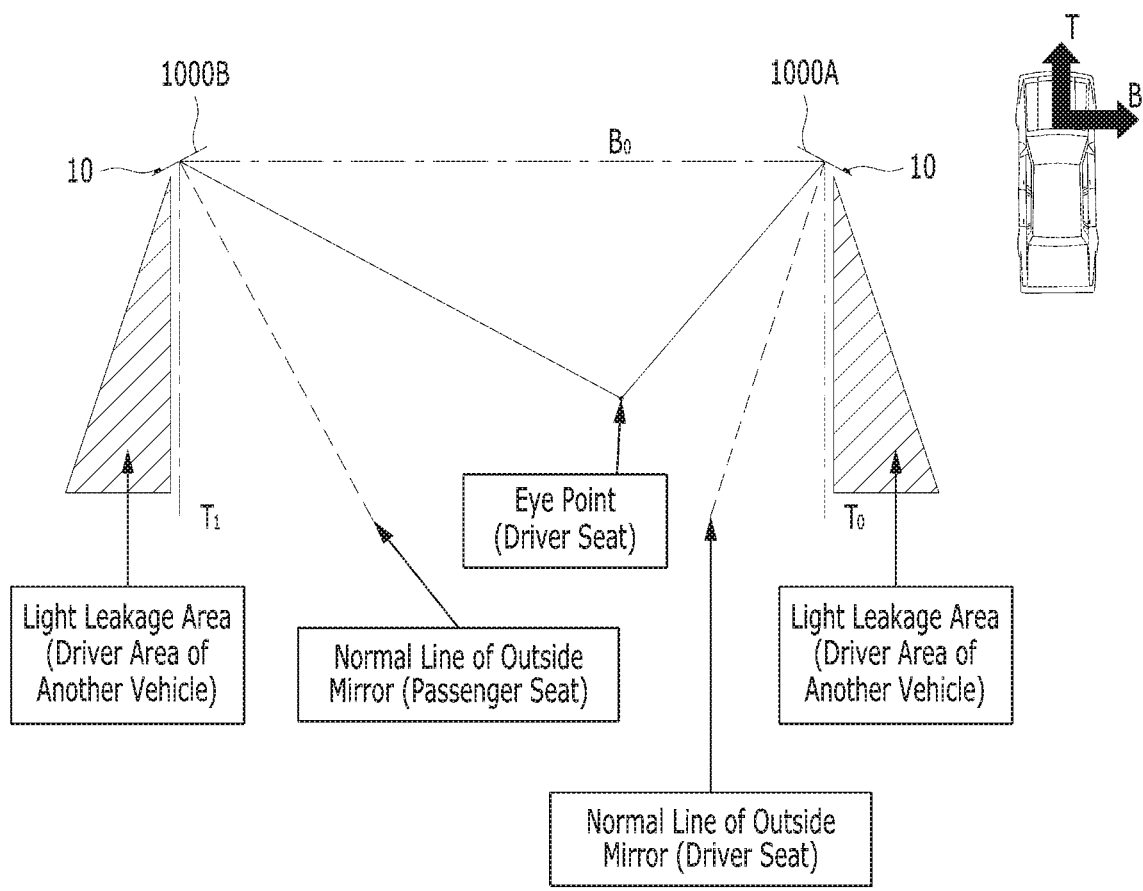
FIG. 3 is a diagram illustrating luminous intensity conditions of the indicator icon of the BSM system mounted in the outside mirror of the vehicle, in a driver area of an ego vehicle and a driver area of another vehicle.
Figure 4:
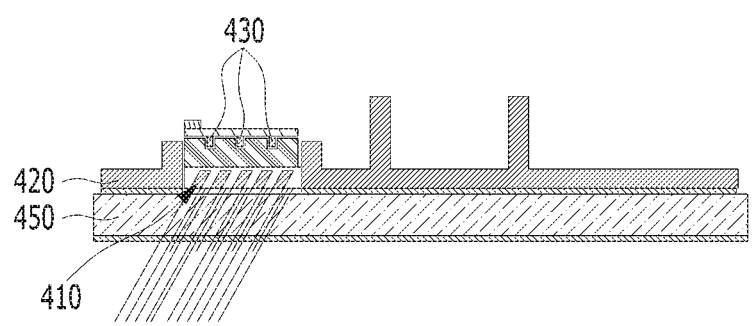
FIG. 4 is a diagram schematically illustrating light emission in a nonreflecting direct-type backlight unit according to the related art.

The purposes, features and advantages or the present disclosure will be more clarified through the following detailed descriptions with reference to the accompanying drawings. Therefore, the technical spirit of the present disclosure will be easily carried out by those skilled in the art to which the present disclosure pertains. Furthermore, the dimensions of components in the drawings are exaggerated or reduced for convenience of description, and detailed descriptions related to publicly known functions or configurations wall be omitted in order not to unnecessarily obscure subject matters of the present disclosure.

The present disclosure can be modified in various manners and embodied in various manners, and specific embodiments will be illustrated in the drawings and described in detail in the detailed description. However, the present disclosure is not limited to the specific embodiments, but may include all modifications, equivalents and substitutions without departing from the spirit and technical scope of the present disclosure. While the respective drawings are described, like components are represented by like reference numerals.

When a certain component is referred to as being "coupled" or "connected" to another component, it may not only indicate that the former component is directly coupled or connected to the latter component, but also indicate that another component present between the former component and the latter component. On the other hand, when a certain component is "directly coupled" or "directly connected" to another component, may indicate that no component present between the former component and the latter component.

The terms used in this application are only used to describe a specific embodiment, and not intended to limit the present disclosure. The terms of a singular form may include plural forms unless referred to the contrary. In this application, the meaning of "include" or "have" specifies a property, a number, a step, a process, an element, a component, or combinations thereof, but does not exclude one or more other properties, numbers, steps, processes, elements, components, or combinations thereof.

All terms used herein may have the same meanings as those generally understood those skilled in the art to which the present disclosure pertains, as long as tale terms are differently defined. The terms defied in a generally used dictionary should be analyzed to have meanings which coincide with contextual meanings in the related art. As long as the terms are not clearly defined in this application, the terms should not be analyzed as ideal or excessively formal meanings.

Hereinafter, exemplary embodiments of the present disclosure will be described in detail with reference to the accompanying, drawings.

First Embodiment

Hereinafter, backlight unit in accordance with a first embodiment of the present disclosure will be described with reference to FIG. 5 to 7.

The backlight unit 10 for an outside mirror of a vehicle in accordance with the first embodiment of the present disclosure will be described based on a vehicle in which a driver seat is disposed on the right and a passenger seat is disposed on the left. However, the backlight unit 10 may also be applied in the same manner to a vehicle in which a driver seat is disposed on the left and a passenger seat is disposed on the right.

Figure 5:
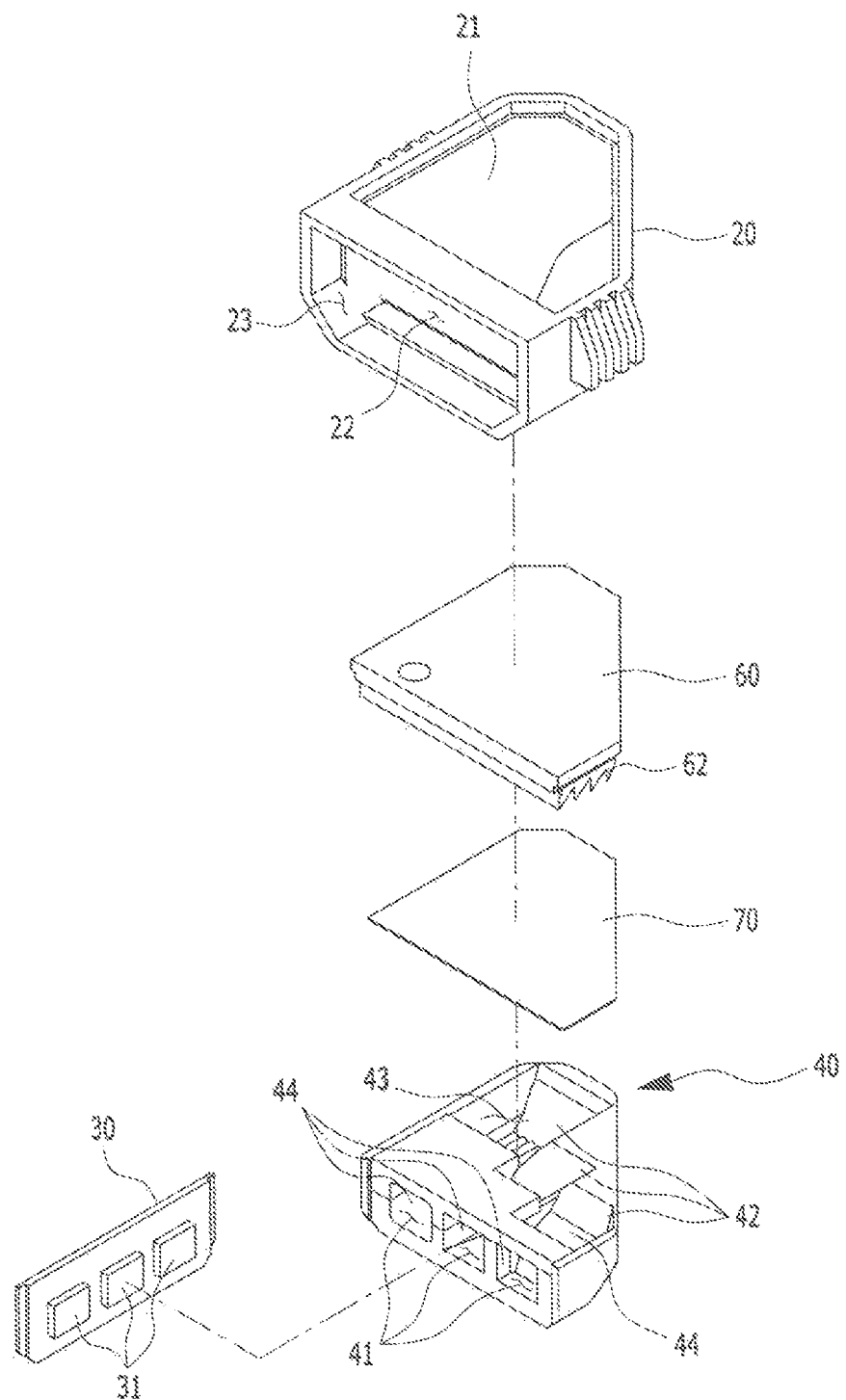
FIG. 5 is an exploded perspective view illustrating a backlight unit in accordance with an embodiment of the present disclosure.
Figure 6:
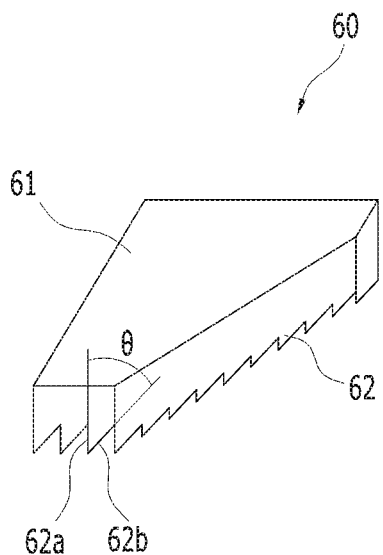
FIG. 6 is a schematic perspective view illustrating a light refraction unit in the backlight unit of FIG. 5.
Figure 7:
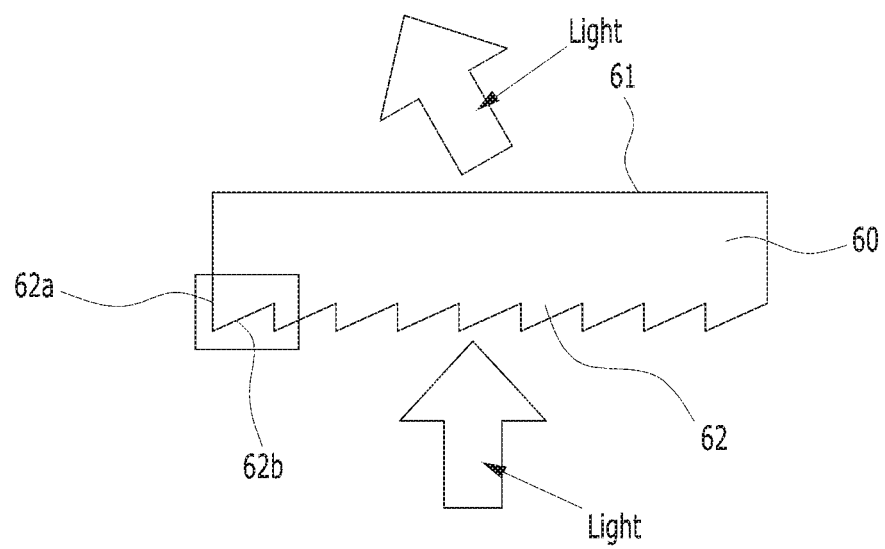
FIG. 7 is a diagram illustrating a path of light passing through the light refraction unit in the backlight unit of FIG. 5.

FIG. 5 is an exploded perspective view illustrating the backlight unit in accordance with the embodiment of the present disclosure, FIG. 6 is a schematic perspective view illustrating a light refraction unit in the backlight unit of FIG. 5, and FIG. 7 is a diagram illustrating a path of light passing through the light refraction unit of the backlight unit of FIG. 5.

Referring to FIGS. 5 to 7, the backlight unit 10 for an outside mirror of a vehicle in accordance with the embodiment of the present disclosure may include a housing 20, a light source unit 30, a light processing unit 40 and a light refraction unit 60.

Specifically, the housing 20 is a trapezoidal hexahedron component having an internal space 22 for storing the components therein, and may include a window 21 and a side opening 23. The window 21 may be formed on the front surface of the housing 20 as one body with the housing 20 through double injection molding, and formed in transparent or white color. The side opening 23 may be formed on one side surface of the housing 20 such that the components are inserted into the housing 20 through the side opening 23.

The light source unit 30 may include one or more LEDs (hereinafter, referred to as 'light source') 31 mounted on a PCB. The light source unit 30 may be mounted in the housing 20 and configured to emit light in a direction parallel to a light path 41 of the light processing unit 40 to be described below, when power is supplied. However, the light source 31 in accordance with the embodiment of the present disclosure is not limited to an LED, but another type of light source capable of exhibiting the same function as the LED may be used as the light source 31.

The light processing unit 40 may include one or more light paths 41 and one or more reflecting surfaces 42. Light emitted from the light source 31 may be uniformly dispersed while passing through the light path 41, which makes it possible to significantly improve the uniformity of light across the entire cross-section of the light path 41. Furthermore, the light path 41 may have a reflection coating layer 44 formed thereon, in order to reduce a light loss as much as possible.

The reflecting surface 42 may serve to reflect the light having passed through the light path 41 such that the light radiates through one or more front openings 43 of the light processing unit 40. The reflecting surface 42 may be configured to form an obtuse angle with respect to the longitudinal direction of the light path 41.

The light refraction unit 60 is disposed at a light exit of the light processing unit 40, and serves to refract light illuminated from the light exit of the light processing unit 40 toward a driver seat. Such a configuration can retain the luminous intensity of light of the backlight unit 10, illuminated to a driver area of an ego vehicle, at about 0.4 to 0.6 cd and retain the luminous intensity in a light leakage area at about 0.2 cd or less. Here, the driver area of the ego vehicle indicates an area located on the left side of a mirror normal line of an outside mirror 1000A on the driver side, and the light leakage area indicates an area located on the right side of the mirror normal line of the outside mirror 1000A on the driver side, or specifically an outer area of an axis $T_0$ parallel to the side surface of a vehicle body. Thus, the luminous intensity of the backlight unit 10 in the light leakage area corresponding to a driver area of another vehicle may be sufficiently lowered to such an extent that drivers in vehicles located on the right rear side of the ego vehicle can clearly distinguish between flickering of a BSM indicator icon of the outside mirror and flickering of an assist turn signal mounted on an outer leading edge of the outside mirror.

As illustrated in FIGS. 6 and 7, the light refraction unit 60 may have a flat front surface 61 and a plurality of protrusions 62. The plurality of protrusions 62 may be formed on a rear surface facing the light exit of the light processing unit 40 and arranged in a vertical direction. Each of the protrusions 62 may have a vertical surface 62a and an inclined surface 62b incline in the opposite direction of the driver seat. Through such a configuration, light illuminated from the light processing unit 40 of the backlight unit incident in direction perpendicular to the horizontal axis of the light retraction unit 60, and refracted to the left (driver area) when leaving the front surface 61 of the light refraction unit 60 through the plurality of protrusions 62. As the light is refracted to the driver area, the luminous intensity of the light leakage area, which corresponds to a driver area of another vehicle and faces the driver area based on the normal line of the outside mirror, may be lowered to a tower value than that of the driver area.

Figure 8A:
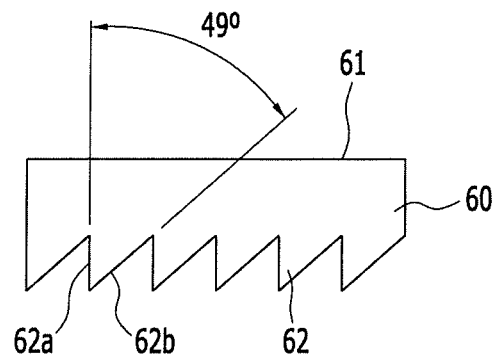
FIG. 8A is a cross-sectional view illustrating a light refraction unit of the backlight unit in accordance with the embodiment of the present disclosure, which is mounted in an outside mirror on a driver side.
Figure 8B:
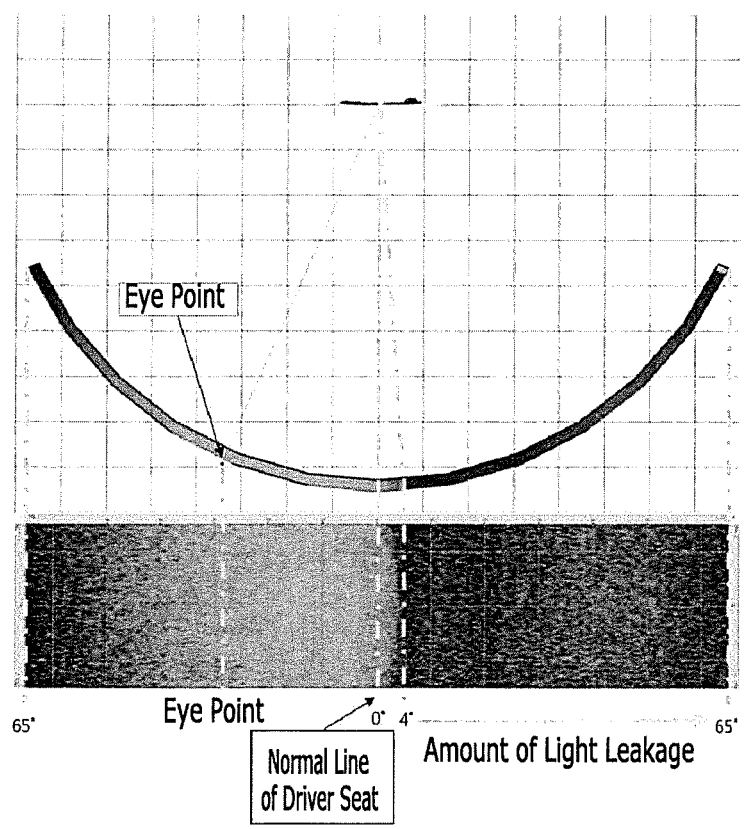
FIG. 8B is a graph illustrating luminous intensity distributions depending on directions in the outside mirror in which the backlight unit including the light refraction unit of FIG. 8A is installed.

For example, when the angle θ between the vertical surface 62a and the inclined surface 62b of the protrusion 62 in the light refraction unit 60 of the backlight unit 10 mounted in the outside mirror 1000A on the driver side is about 49°, the luminous intensity of light emitted from the backlight unit 10 along a circumference with a radius set to a distance from the center of the outside mirror 1000A to the driver's eye point was measured under the following light simulation condition, the driver's eye point corresponding to a point that has an azimuth angle of about −23.224° from the normal line of the outside mirror on the driver side and is located about 800 mm away from the center of the mirror. As shown in FIG. 8B and Table 1 showing the measurement results, the luminous intensity in the driver area located on the left side (−azimuth angle area) of the mirror normal line was measured at about 0.59 cd, and the luminous intensity in the light leakage area (driver area of another vehicle) located on the right side (+azimuth angle area) of the mirror normal line was measured at about 0.140 cd to 0.198 cd.

TABLE 1

| Azimuth angle | −60° | −50° | −40° | −30° | −20° | −10° | 0° |
|---|---|---|---|---|---|---|---|
| Luminous intensity | 0.122 | 0.236 | 0.412 | 0.484 | 0.595 | 0.593 | 0.448 |
| Azimuth angle | 4° | 10° | 20° | 30° | 40° | 50° | 60° |
| Luminous intensity | 0.204 | 0.152 | 0.140 | 0.198 | 0.197 | 0.185 | 0.157 |

* Light simulation conditions

Measurement range: Left-to-right range of −65° to +65° and top-to-bottom range of −15° to +15° based on the mirror
LED: Flux 71 m, Dominant wavelength 590 nm and Intensity degree 120°
Diffuser: Light transmittance 95% and HAZE 89.5%
Lighting guide reflectance: 80%

The front surface 61 of the light refraction unit 60 in the backlight unit 10 installed on the rear surface of the outside mirror 1000A mounted on the driver side of the vehicle may be formed as a flat surface, and the plurality of protrusions 62 each giving the vertical surface 62a and the inclined surface 62b inclined in the opposite direction of the driver seat may be arranged in a vertical direction on the rear surface facing the light exit of the light processing unit 40. In this case, the angle θ between the inclined surface 62b of the light refraction unit 60 and the surface 62a perpendicular to the horizontal axis of the light refraction unit 60 in the backlight unit 10 installed on the rear surface of the outside mirror 1000A may be preferably set in the range or about 39° to 59°. When the angle θ of the protrusion 62 of the light refraction unit 60 becomes equal to or less the luminous 39°, the luminous intensity of the driver area becomes 0.4 cd or less, thereby degrading the visibility of the indicator icon in the BSM system of the outside mirror. When the angle θ of the protrusion 62 of the light refraction unit becomes 59° or more, an excessive amount of light leaks to a driver area of another vehicle, such that the luminous intensity becomes 0.2 cd or more. In this case, the driver of the another vehicle may mistake the flickering of the backlight unit for the flickering of the assist turn signal. More preferably, the angle θ between the inclined surface 62b of the light refraction unit 60 and the surface 62a perpendicular to the horizontal axis of the light refraction unit may range from about 44° to 54°.

On the other hand, the rear surface of the light refraction unit 60, on which light is incident, may be formed as a flat surface parallel to the horizontal axis of the light refraction unit 60, and the front surface of the light refraction unit 60, from which light is illuminated, may have protrusions (not illustrated) each including a vertical surface and an inclined surface.

Figure 9A:
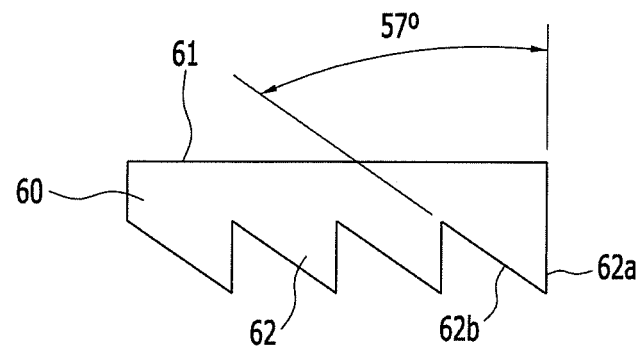
FIG. 9A is a cross-sectional view illustrating a light refraction unit of the backlight unit in accordance with the embodiment of the present disclosure, which is mounted in an outside mirror on a passenger side.
Figure 9B:
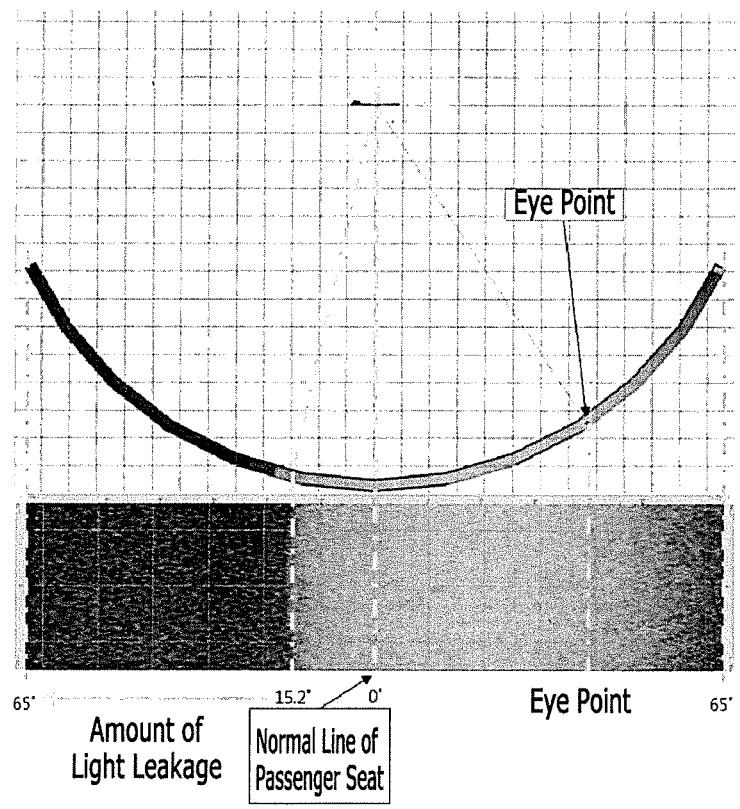
FIG. 9B is a graph illustrating luminous intensity distributions depending on directions in the outside mirror in which the backlight unit including the light refraction unit of FIG. 9A is installed.

Furthermore, when the angle θ between the vertical surface 62a and the inclined surface 62b of the protrusion 62 in the light refraction unit 60 of the backlight unit 10 mounted in an outside mirror 1000B on a passenger side is about 57°, the luminous intensity of light emitted from the backlight unit 10 along a circumference with a radius set to a distance from the center of the outside mirror 1000B to the driver's eye point was measured under the following light simulation condition, the driver's eye point corresponding to a point that has an azimuth angle of about 33,595° from the normal line of the outside mirror on the passenger side to the right side and is located about 1,300 mm away from the center of the mirror. As shown in FIG. 9B and Table 2 showing the measurement results, the luminous intensity in the driver area located on the right side (+azimuth angle area) of the mirror normal line was measured at about 0.48 cd, and the luminous intensity in the light leakage area (driver area of another area) located on the left side (−azimuth angle area) of the mirror normal line was measured at about 0.075 cd to 0.119 cd.

TABLE 2

| Azimuth angle | −60° | −50° | −40° | −30° | −20° | −15.2° | 0° |
|---|---|---|---|---|---|---|---|
| Luminous intensity | 0.098 | 0.113 | 0.119 | 0.075 | 0.094 | 0.194 | 0.413 |
| Azimuth angle | 0° | 10° | 20° | 30° | 40° | 50° | 60° |
| Luminous intensity | 0.543 | 0.609 | 0.650 | 0.593 | 0.480 | 0.339 | 0.177 |

* The light simulation conditions are the same as the light simulation conditions of the backlight unit in the outside mirror 1000 A on the driver side.

The front surface 61 of the light refraction unit 60 in the backlight unit 10 installed on the rear surface of the outside mirror 1000B mounted in the passenger seat of the vehicle may be formed as a flat surface, and the plurality of protrusions 62 each having the vertical surface 62a and the inclined surface 62b inclined in the opposite direction of the driver seat may be arranged in a vertical direction on the rear surface facing the light exit of the light processing unit 40. In this case, the angle θ between the inclined surface 62b of the light refraction unit 60 and the vertical surface 62a perpendicular to the horizontal axis of the light refraction unit in the backlight unit 10 installed on the rear surface of the outside mirror 1000B may be preferably set in the range of 47° to 67°. When the angle θ of the protrusion 62 of the light refraction unit 60 becomes equal to or less than 47°, the luminous intensity of the driver area becomes 0.4 cd or less, thereby degrading the visibility of the indicator icon, in the BSM system of the outside mirror. When the angle θ of the protrusion 62 of the light refraction unit 60 becomes 67° or more, an excessive amount of light leaks to a driver area of another vehicle, such that the luminous intensity becomes 0.2 cd or more. In this case, the driver of the another vehicle may mistake the flickering of the backlight unit for the flickering of the assist turn signal. More preferably, the angle θ between the inclined surface 62b of the light refraction unit 60 and the surface 62a perpendicular to the horizontal axis of the light refraction unit 60 may range from about 52° to 62°.

On the other hand, the rear surface of the light refraction unit 60, on which light is incident, may be formed as a flat surface parallel to the horizontal axis of the light refraction unit 60, and the front surface of the light refraction unit 60, from which light is emitted, may have protrusions (not illustrated) each including a vertical surface and an inclined surface.

The light refraction unit 60 may be formed of glass, plastic, PMMA (Poly Methyl MethAcrylate) resin or crystal. However, the present embodiment is not limited thereto, and other publicly-known materials capable of refracting an optical path may be used.

A diffusion plate 70 may be located on the front surface of the light processing unit 40, on which the front opening 43 is formed, and serve to implement more uniform brightness and color. The diffusion plate 70 may be disposed on the front surface of the light refraction unit 60. However, such a diffusion plate 70 is not an essential component which is necessarily installed to constitute the backlight unit 10.

In the above-described backlight unit 10 for the outside mirror of a vehicle accordance with the first embodiment of the present disclosure, the luminous intensity of light of the backlight unit 10, emitted to the driver area of the ego vehicle, may be retained at about 0.4 to 0.6 cd, and the luminous intensity of the backlight unit 10 in the light leakage area (the driver area of another vehicle) corresponding to an area outside each of the axes T0 and T1 parallel to the side surfaces of the vehicle body may be retained at about 0.2 cd or less. Thus, the luminous intensity of the backlight unit 10 in a driver area of another vehicle may be sufficiently lowered to prevent a situation in which drivers in vehicles located on the right and left rear sides of the ego vehicle may mistake the flickering of the BSM indicator icon of the outside mirror for the flickering of the assist turn signal mounted on the outer leading edge of the outside mirror.

Second Embodiment

Hereinafter, a backlight unit 100 in accordance with a second embodiment of present disclosure will be described with reference to FIGS. 10 and 11.

The backlight unit 100 for an outside mirror of a vehicle in accordance with the second embodiment of the present disclosure will be described based on a vehicle in which a driver seat is disposed on the right and a passenger seat is disposed on the left. However, the backlight unit 100 may also be applied in the same manner to a vehicle in which a driver seat is disposed on the left and a passenger seat is disposed on the right.

In the following descriptions for the configuration and operation of the backlight unit 100 in accordance with the second embodiment of the present disclosure, the overlapping contents of those of the backlight unit 10 in accordance with the first embodiment of the present disclosure will be omitted herein. FIG. 10 is an exploded perspective view illustrating the backlight unit in accordance with the second embodiment of the present disclosure, and FIG. 11 is a schematic perspective view illustrating, a light refraction unit in the backlight unit of FIG. 10.

Figure 10:
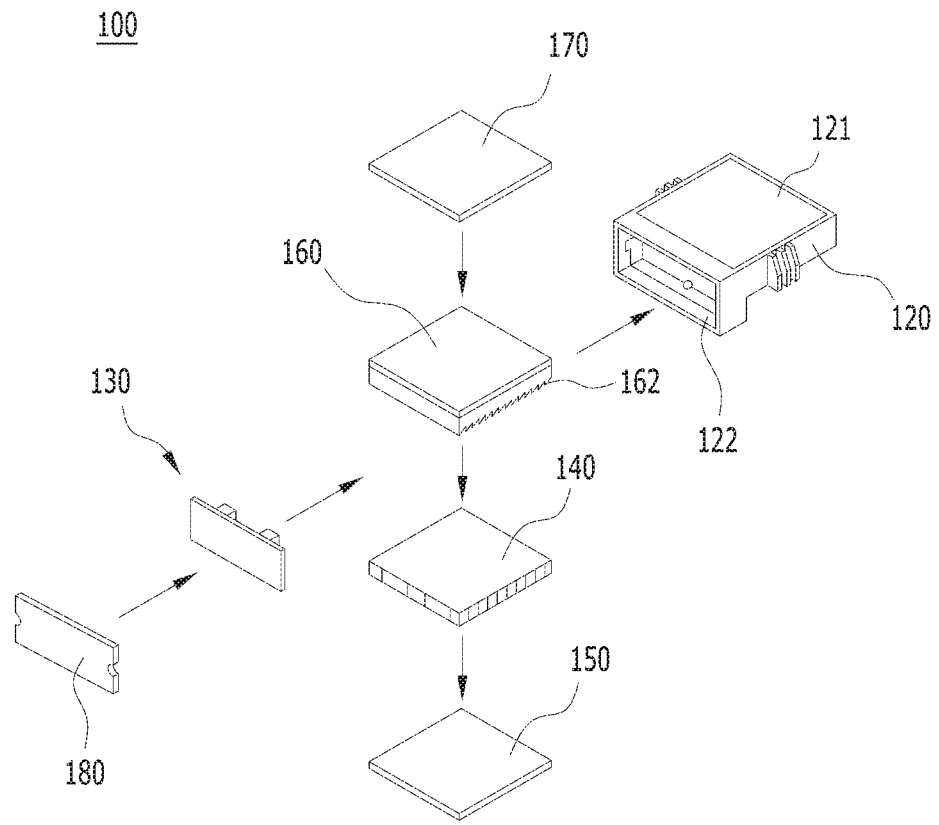
FIG. 10 is an exploded perspective view illustrating a backlight unit in accordance with another embodiment of the present disclosure.
Figure 11:
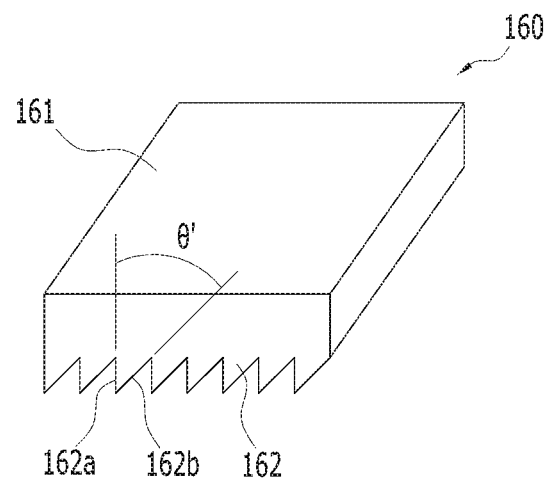
FIG. 11 is a schematic perspective view illustrating a light refraction unit in the backlight unit of FIG. 10.

Referring to FIGS. 10 and 11, the backlight unit 100 for an outside mirror of a vehicle in accordance with the second embodiment of the present disclosure may include a case 120, a light source unit 130, a light guide plate 140, a reflecting plate 150 and a light refraction unit 160.

Since the case 120 and the light source unit 130 have similar structures to the housing 20 and the light source unit 30 in accordance with the first embodiment, respectively, the detailed descriptions thereof will be omitted herein.

The light guide plate 140 is a plate-shaped component which uniformly diffuses light emitted from the light source unit 130 across the entire area of the light guide plate 140 and switches a dot light source or line light source into a surface light source. The light guide plate 140 is located in front of the light source unit 130 and mounted in the internal space of the case 120. The light emitted from the light source unit 130 is incident on the light guide plate 140. Then, the light incident on the light guide plate 140 is spread and reflected by a surface pattern formed on the rear surface of the light guide plate 140, and thus uniformly diffused across the entire area of the light guide plate 140.

The reflecting plate 150 is a plate-shaped component which is stacked on the rear surface of the light guide plate 140 so as to reflect and serves to reflect light illuminated from the rear surface of the light guide plate 140 toward the front surface of the light guide plate 140, thereby preventing a light loss.

The light refraction unit 160 is stacked on the front surface of the light guide plate 140, and serves to refract light illuminated from the front surface of the light guide plate 140 toward a driver seat. Such a configuration can retain the luminous intensity of light of the backlight unit 100, illuminated to a driver area of an ego vehicle, at about 0.4 to 0.6 cd, and simultaneously retain the luminous intensity in a light leakage area at about 0.2 cd or less. The driver area of the ego vehicle indicates an area located on the left side of a mirror normal line of the outside mirror 1000A on the driver side, and the light leakage area indicates an area located on the right side of the mirror normal lime of the outside mirror 1000A on the driver side, or specifically an area outside an axis $T_0$ parallel to the side surface of the vehicle body. Thus, the luminous intensity of the backlight unit 100 in the light leakage area corresponding to a driller area of another vehicle may be sufficiently lowered to such an extent that drivers in vehicles located on the right rear side of the ego vehicle can clearly distinguish between flickering of a BSM indicator icon of the outside mirror and flickering of an assist turn signal mounted on an outer leading edge of the outside mirror.

Since the detailed configuration and operation effect of the light refraction unit 160 are similar to those of the light refraction unit 60 installed in the backlight unit 10 in accordance with the first embodiment, the detailed descriptions thereof will be omitted herein.

A diffusion plate 170 may be located on the front or rear surface of the light refraction unit 160, and serve to implement more uniform brightness and color. However, such a diffusion plate 170 is not an essential component which is necessarily installed to constitute the backlight unit 100.

Third Embodiment

Hereinafter, a backlight unit 200 in accordance with a third embodiment of the present disclosure will be described with reference to FIGS. 12 and 13.

The backlight unit 200 for an outside mirror of a vehicle in accordance with the third embodiment of the present disclosure will be described based on a vehicle in which a driver seat is disposed on the right and a passenger seat is disposed on the left. However, the backlight unit 200 may also be applied in the same manner to a vehicle in which a driver seat is disposed on the left and a passenger seat is disposed on the right.

In the following descriptions of the configuration and operation of the backlight unit 200 in accordance with the third embodiment of the present disclosure, the overlapping contents of those of the backlight units 10 and 100 in accordance with the first and second embodiments of the present disclosure will be omitted herein. FIG. 12 is an exploded perspective view illustrating the backlight unit 200 in accordance with the third embodiment of the present disclosure, and FIG. 13 is a schematic perspective view illustrating a light refraction unit 260 in the backlight unit 200 of FIG. 12.

Figure 12:
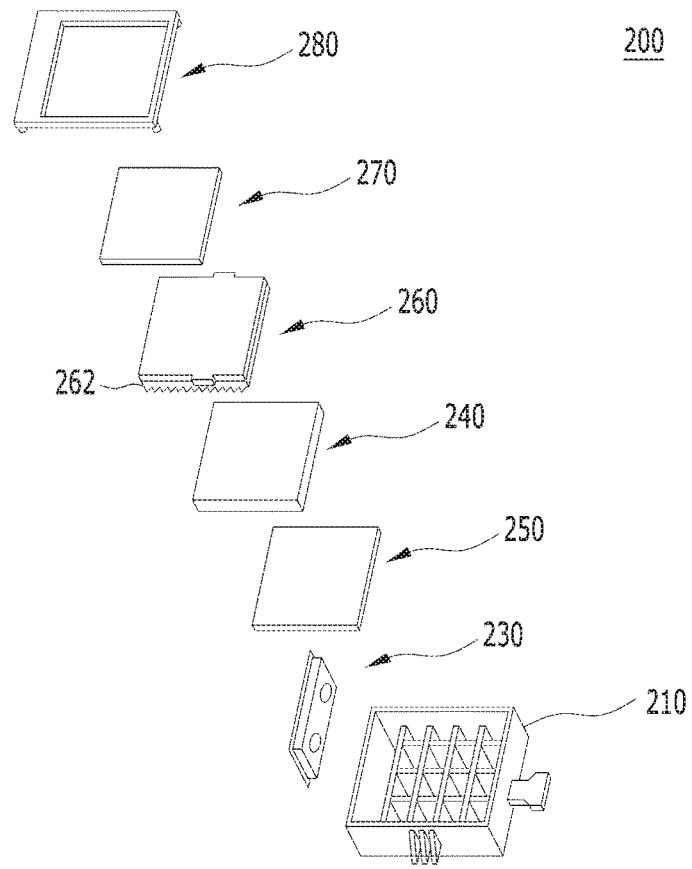
FIG. 12 an exploded perspective view illustrating a backlight unit in accordance with still another embodiment of the present disclosure.
Figure 13:
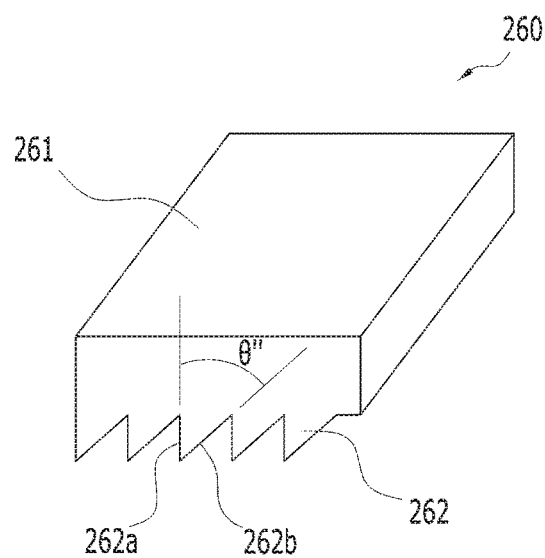
FIG. 13 is a schematic perspective view illustrating a light refraction unit in the backlight unit of FIG. 12.

Referring to FIGS. 12 and 13, the backlight unit 200 for an outside mirror of a vehicle in accordance with the third embodiment of the present disclosure may include a lower casing 210, a light source unit 230, a light guide plate 240, a reflecting plate 250, a light refraction unit 260, a diffusion plate 270 and an upper casing 280.

Since the light source unit 230, the light guide plate 240 and the reflecting plate 250 have similar structures to the light source unit 130, the light guide plate 140 and the reflecting plate 150 in the backlight unit 100 in accordance with the second embodiment of the present disclosure, the detailed descriptions thereof will be omitted herein.

The lower casing 210 has an opening formed at the top thereof such that the reflecting plate 250, the light guide plate 240, the light refraction unit 260 and the diffusion plate 270 are sequentially stacked, and the light source unit 230 is disposed in front of the light guide plate 240. After the components 230, 240, 250, 260 and 270 are inserted through the upper opening or the lower casing 210, the upper casing 280 is coupled to the top of the lower casing 210 through a publicly known method.

The light refraction unit 260 is stacked on the front surface of the light guide plate 240, and serves to refract light illuminated from the front surface of the light guide plate 240 toward a driver seat. Such a configuration can retain the luminous intensity of light of the backlight unit 200, illuminated to a driver area of an ego vehicle, at about 0.4 cd to 0.6 cd, and simultaneously retain the luminous intensity in a light leakage area at about 0.2 cd or less. The driver area of the ego vehicle indicates an area located on the left side of a mirror normal line of the outside mirror 1000A on the driver side, and the light leakage area indicates an area located on the right side of the mirror normal line of the outside mirror 1000A on the driver side, or specifically an area outside an axis $T_0$ parallel to the side surface of the vehicle body. Thus, the luminous intensity of the backlight unit 200 in the light leakage area corresponding to a driver area of another vehicle may be sufficiently lowered to such an extent that drivers in vehicles located on the right rear side of the ego vehicle can clearly distinguish between flickering of a BSM indicator icon of the outside mirror and flickering of an assist turn signal mounted on an outer leading edge of the outside mirror.

Since the detailed configuration and operation effect of the light refraction unit 260 are similar to those of the light refraction unit 60 installed in the backlight unit 10 in accordance with the first embodiment, the detailed descriptions thereof will be omitted herein.

The diffusion plate 270 may be located on the front or rear surface of the light refraction unit 260, and serve to implement more uniform brightness and color. However, such a diffusion plate 270 is not an essential component which is necessarily installed to constitute the backlight unit 200.

The preferred embodiments of the invention have been described in detail with reference to appended drawings. However, it will be appreciated by one skilled in the art that various substitutions, modifications and/or changes may be made to these embodiments without departing from the spirit of the invention. Therefore, the scope of the invention is not limited to the above described embodiments but is defined by the following claims and their equivalents.

The invention claimed is:

1. A backlight unit for an outside mirror of a vehicle, comprising:
    a light source unit 30 having one or more light sources 31;
    a light processing unit 40 having one or more light paths 41 through which light emitted from the light source 31 passes while dispersing and a reflecting surface 42 which reflects the light having passed through the light path 41; and
    a light refraction unit 60 disposed at a light exit of the light processing unit, and configured to refract light illuminated from the light exit of the light processing unit toward a driver seat,
    wherein the light refraction unit 60 has a plurality of protrusions 62 arranged in a vertical direction on a rear surface thereof, which faces the light exit of the light processing unit 40 and on which light is incident,
    wherein a front surface 61 of the light refraction unit 60, from which the light incident on the light refraction unit is emitted, is formed as a flat surface parallel to a horizontal axis of the light refraction unit 60; and
    wherein each of the protrusions 62 has a vertical surface 62a and an inclined surface 62b inclined in the opposite direction of the driver seat.

2. The backlight unit of claim 1, wherein the angle θ between the inclined surface 62b of the light refraction unit 60 and the surface 62a perpendicular to the horizontal axis of the light refraction unit 60 in a backlight unit 10 installed on a rear surface of an outside mirror 1000A mounted on a driver side of the vehicle ranges from about 39° to 59°; and
    the angle θ between the inclined surface 62b of the light refraction unit 60 and the surface 62a perpendicular to the horizontal axis of the light refraction unit 60 in a backlight unit 10 installed on a rear surface of an outside mirror 1000B mounted on a passenger side of the vehicle ranges from about 47° to 67°.

3. The backlight unit of claim 1, wherein the brightness of light in the driver area emitted through the backlight unit 10 ranges from about 0.4 to 0.6 cd, and
    the brightness of light in a driver area of another vehicle is about 0.2 cd or less.

4. The backlight unit of claim 1, wherein the reflecting surface 42 forms an obtuse angle with respect to the longitudinal direction of the light path 41.

5. The backlight unit of claim 1, wherein the light path 41 has a reflection coating layer 44 formed on the surface thereof.

6. An outside mirror for a vehicle, comprising the backlight unit of claim 1.

7. A backlight unit 100 for an outside mirror of a vehicle, comprising:
- a case 120 having an internal space and having an opening formed on a side surface thereof,
- a light source unit 130 mounted in the internal space of the case 120 and capable of emitting light when power is supplied;
- a light guide plate 140 configured to diffuse light emitted from the light source unit 130 across the entire area thereof; and
- a light refraction unit 160 stacked on a front surface of the light guide plate 140 and configured to refract light illuminated from the front surface of the light guide plate toward a driver seat,
- wherein the light refraction unit 160 has a plurality of protrusions 162 vertically arranged in a vertical direction on a rear surface thereof, which faces the light guide plate 140 and on which light is incident,
- wherein a front surface 161 of the light refraction unit 160, from which the light incident on the light refraction unit is emitted, is formed as a flat surface parallel to a horizontal axis of the light refraction unit 160; and
- wherein each of the protrusions 162 comprises a vertical surface 162a perpendicular to the horizontal axis of the light refraction unit 160 and an inclined surface 162b inclined in the opposite direction of the driver seat.

8. The backlight unit of claim 7, wherein the angle θ' between the inclined surface 162b of the light refraction unit 160 and the vertical surface 162a perpendicular to the horizontal axis of the light refraction unit 160 in the backlight unit 100 installed on a rear surface of an outside mirror 1000A mounted on a driver side of the vehicle ranges from about 39° to 59°; and
  the angle θ' between the inclined surface 162b of the light refraction unit 160 and the surface 162a perpendicular to the horizontal axis of the light refraction unit 160 in a backlight unit 100 installed on a rear surface of an outside mirror 1000B mounted on a passenger side of the vehicle ranges from about 47° to 67°.

9. The backlight unit of claim 7, wherein the brightness of light in the driver area, emitted through the backlight unit 100, ranges from about 0.4 to 0.6 cd, and
  the brightness of light in a driver area of another vehicle is about 0.2 cd or less.

10. The backlight unit of claim 7, further comprising a diffusion plate 170 configured to uniformly diffuse light illuminated from the light refraction unit 160, and formed as one body with the light refraction unit.

11. The backlight unit of claim 7, further comprising a window formed on the front surface of the case 120 as one body with the case through double injection molding.

12. An outside mirror for a vehicle, comprising the backlight unit 100 of claim 7.

13. A backlight unit 200 for an outside mirror of a vehicle, comprising:
- a lower casing 210;
- a light source unit 230 mounted on an inner bottom surface of the lower casing 210 and capable of emitting light when power is supplied;
- a light guide plate 240 mounted at an inner top of the lower casing 210 and configured to transfer light emitted from the light source unit;
- a light refraction unit 260 stacked on the front surface of the light guide plate and configured to refract light, illuminated from the front surface of the light guide plate, toward a driver seat; and
- an upper casing 280 having a central portion formed in an open frame shape, and coupled to the top of the lower casing 210,
- wherein the light refraction unit 260 has a plurality of protrusions 262 vertically arranged in a vertical direction on a rear surface thereof, which faces the light guide plate 240 and on which light is incident,
- wherein a front surface 261 of the light refraction unit 260, from which the light incident on the light refraction unit is emitted, is formed as a flat surface parallel to a horizontal axis of the light refraction unit 260; and
- wherein each of the protrusions 262 comprises a vertical surface 262a perpendicular to the horizontal axis of the light refraction unit 260 and an inclined surface 262b inclined in the opposite direction of the driver seat.

\* \* \* \* \*